(12) United States Patent
Nguyen

(10) Patent No.: US 11,447,982 B2
(45) Date of Patent: Sep. 20, 2022

(54) MULTIDIRECTIONAL ENCLOSURE COMPRESSION LOCKING MECHANISM

(71) Applicant: Raytheon Company, Waltham, MA (US)

(72) Inventor: Ly Dinh Nguyen, Cypress, TX (US)

(73) Assignee: Raytheon Company, Waltham, MA (US)

( * ) Notice: Subject to any disclaimer, the term of this patent is extended or adjusted under 35 U.S.C. 154(b) by 431 days.

(21) Appl. No.: 16/364,629

(22) Filed: Mar. 26, 2019

(65) Prior Publication Data
US 2020/0308875 A1    Oct. 1, 2020

(51) Int. Cl.
E05B 65/00        (2006.01)
E05B 17/00        (2006.01)
(Continued)

(52) U.S. Cl.
CPC ........ *E05B 65/001* (2013.01); *E05B 17/0025* (2013.01); *B63B 19/14* (2013.01);
(Continued)

(58) Field of Classification Search
CPC ... E05B 65/001; E05B 17/0025; B63B 19/14; B63B 19/26; E05C 9/08; E05C 17/50;
(Continued)

(56) References Cited

U.S. PATENT DOCUMENTS 1,193,148 A * 8/1916 Hornuing ............ E05B 65/0864
292/210
1,230,021 A * 6/1917 Pembroke ............... E05C 3/046
292/DIG. 40
(Continued)

FOREIGN PATENT DOCUMENTS

CN        202228666 U     5/2012
CN        104577432 B     12/2016
(Continued)

OTHER PUBLICATIONS

Raytheon Company, Prior Acts, PowerPoint disclosure, Jan. 1, 2018, 1 page, Waltham, Massachusetts (L28405KWGREENX5_NPL_FILED_04_20_2022_ANNOTATED_05_04_2022_22_01_44_PM_04_00.pdf) (Year: 2018).*
(Continued)

*Primary Examiner* — Christine M Mills
*Assistant Examiner* — Tal Saif

(57) ABSTRACT

A latch system for locking of a door to a cabinet comprises a latch receiver secured to the cabinet and having first and second ramps and a rest surface. The latch system further comprises a door latch comprising a handle, a shank coupled to the handle, and a cam latch supported by the shank. In response to rotation of the handle (in either rotational directions), the shank and the cam latch rotate to cause a lock arm of the cam latch to slidably interface with the first and second ramps of the latch receiver, and to seat against the rest surface, thus placing the door latch in a locked position. The latch receiver can have a plurality of ramps, and the lock arm can have a plurality of cam surfaces, so that it can be locked from both rotational directions. The door latch can have a compression load adjustment mechanism.

30 Claims, 10 Drawing Sheets

(51) Int. Cl.
  *B63B 19/14* (2006.01)
  *B63B 19/26* (2006.01)
  *E05C 9/08* (2006.01)
  *E05C 17/50* (2006.01)

(52) U.S. Cl.
  CPC ............... *B63B 19/26* (2013.01); *E05C 9/08* (2013.01); *E05C 17/50* (2013.01)

(58) Field of Classification Search
  CPC ............... Y10S 292/11; Y10S 292/71; Y10T 292/0867; Y10T 292/0868; Y10T 292/57; Y10T 292/58; Y10T 292/63; Y10T 292/66
  See application file for complete search history.

(56) References Cited

U.S. PATENT DOCUMENTS

| | | | | |
|---|---|---|---|---|
| 1,775,574 | A * | 9/1930 | Schrader | E05C 3/145 |
| | | | | 292/228 |
| 1,796,923 | A * | 3/1931 | Firestone | E05C 3/145 |
| | | | | 292/336 |
| 2,179,495 | A | 11/1939 | Court et al. | |
| 2,205,845 | A | 6/1940 | Cochran | |
| 2,310,348 | A * | 2/1943 | Blears | E05C 3/043 |
| | | | | 292/202 |
| 2,315,239 | A | 3/1943 | Young | |
| 2,493,980 | A | 1/1950 | Lambert | |
| 2,511,268 | A | 6/1950 | Schiff | |
| 2,610,079 | A | 9/1952 | Lambert | |
| 2,860,904 | A * | 11/1958 | Johnk | E05B 65/006 |
| | | | | 292/206 |
| 2,991,904 | A * | 7/1961 | Blaise | A21C 13/00 |
| | | | | 217/60 R |
| 3,347,580 | A * | 10/1967 | Whiting | E05B 65/0811 |
| | | | | 292/242 |
| 4,088,355 | A * | 5/1978 | Dey | F16B 21/02 |
| | | | | 411/389 |
| 4,864,076 | A | 9/1989 | Stickney | |
| 5,086,587 | A | 2/1992 | Andrews | |
| 5,147,121 | A | 9/1992 | McIlwraith | |
| 5,313,738 | A | 5/1994 | Thakur et al. | |
| 5,473,236 | A | 12/1995 | Frolov | |
| 5,785,362 | A * | 7/1998 | Nadherny | B61D 7/24 |
| | | | | 292/124 |
| 6,446,393 | B1 | 9/2002 | Marston, Sr. et al. | |
| 6,530,250 | B1 | 3/2003 | Linares et al. | |
| 6,799,396 | B1 | 10/2004 | Redfern et al. | |
| 7,017,229 | B2 | 3/2006 | Walcome | |
| 7,100,951 | B2 * | 9/2006 | Jien | E05C 3/043 |
| | | | | 292/241 |
| 8,287,010 | B2 * | 10/2012 | Holzer | E05B 55/005 |
| | | | | 292/341.15 |
| 8,336,931 | B2 * | 12/2012 | Cotton | E05B 1/003 |
| | | | | 292/DIG. 31 |
| 8,485,566 | B2 * | 7/2013 | Borning | E05B 5/00 |
| | | | | 292/137 |
| 9,745,794 | B2 * | 8/2017 | Ellingson | E06B 7/2305 |
| 2004/0056488 | A1 * | 3/2004 | Jackson, Jr. | E05C 5/02 |
| | | | | 292/66 |
| 2005/0077735 | A1 | 4/2005 | Generowicz et al. | |
| 2006/0038414 | A1 | 2/2006 | Jien | |
| 2006/0075950 | A1 | 4/2006 | Dasilva | |
| 2007/0108877 | A1 * | 5/2007 | Bergmann | E05C 3/042 |
| | | | | 312/219 |
| 2008/0036344 | A1 * | 2/2008 | Johnson | E05B 63/244 |
| | | | | 312/324 |
| 2011/0309639 | A1 * | 12/2011 | Chen | E05C 9/042 |
| | | | | 292/140 |
| 2014/0331722 | A1 * | 11/2014 | Bridgewater | E05C 3/042 |
| | | | | 292/65 |
| 2015/0075080 | A1 | 3/2015 | Ellingson | |

FOREIGN PATENT DOCUMENTS

| | | | |
|---|---|---|---|
| DE | 102017121787 A1 | | 3/2019 |
| EP | 0167767 B1 | | 4/1988 |
| GB | 1200346 A | | 7/1970 |
| JP | 2016127102 A | * | 7/2016 |
| KR | 2010-0079857 A | | 7/2010 |
| KR | 20120109862 A | | 10/2012 |
| KR | 200467422 Y1 | | 6/2013 |
| KR | 200471981 Y1 | | 3/2014 |
| WO | WO-2009021284 A1 | * | 2/2009 ........... E05B 35/008 |

OTHER PUBLICATIONS

Cen-Tex Marine, Door Dog Replacement Assembly Drawing RD 100, http://www.centexmarine.com/ONLINECATALOG.html, to the best of applicant's knowledge article was available before the application filing date, 3 pages, Cen-Tex Marine Fabricators Inc, Smithville, TX, Mar. 25, 2019.
ATEX Delvalle, ATEX Enclosure Ex TRIBEX Series, https://www.atexdelvalle.com/catalogos/Tribex_IP66_Delvalle_EN_v1.0-16.pdf, retrieved on Mar. 3, 2020, 14 pages, retrieved from https://www.atexdelvalle.com/catalogos/Tribex_IP66_Delvalle_EN_v1.0-16.pdf.
Raytheon Company, Prior Acts, PowerPoint disclosure, Jan. 1, 2018, 1 page, Waltham, Massachusetts.
Cen-Tex Marine, Door Dog Replacement Assembly Drawing RD100, http://www.centexmamie.com/ONLINECATALOG.html, to the best of applicant's knowledge article was available before the application filing date, 3 pages, Cen-Tex Marine Fabricators Inc, Smithville, TX.
ATEX Delvalle, ATEX Enclosure Ex TRIBEX Series, https://www.atexdelvalle.com/catalogos/Tribex_66_Delvalle_EN_v1.0-16.pdf, retrieved on Mar. 3, 2020, 14 pages, retrieved from https://www.atexdelvalle.com/catalogos/Tribex_66_Delvalle_EN_v1.0-16.pdf.
International Search Report for International Application No. PCT/US2020/014951 dated Apr. 14, 2020, 18 pages.

* cited by examiner

MULTIDIRECTIONAL ENCLOSURE COMPRESSION LOCKING MECHANISM

GOVERNMENT LICENSE RIGHTS

This invention was made with government support under contract N00024-15-C-5410 awarded by Naval Sea Systems Command. The government has certain rights in the invention.

BACKGROUND

Various types of enclosures, such as electrical cabinets, receive, house and support electronic or other components sensitive to debris and/or moisture. Completely closing and sealing the cabinet with a door (supporting a seal) is critical to prevent ingress of moisture and debris into the cabinet, as well as high velocity rainfall droplets during outdoor transit, which could damage the electronic components contained therein. Some electrical cabinets are attached upside down to a supporting structure, such as a RAM (rolling airframe missile) launcher on a vessel, which makes it ergonomically difficult to close and lock the door via a plurality of door dogs/latches because the operator must be positioned upside down or inverted to operate the door dogs/latches. This is particularly problematic where a tool is required to lock all of the door dogs/latches to the cabinet.

Another problem is the fact that prior door dogs/latches do not provide uniform sealing around the entire length of a seal between the door and the cabinet, particularly at corner areas of the seal where higher compression loads are typically required to generate uniform sealing around the perimeter of the door. Furthermore, some door dogs/latches, such as those in use on a RAM, must withstand substantial G forces during weapon firing (e.g., RAM firing) while maintain the ability to retract and maintain sealing integrity.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
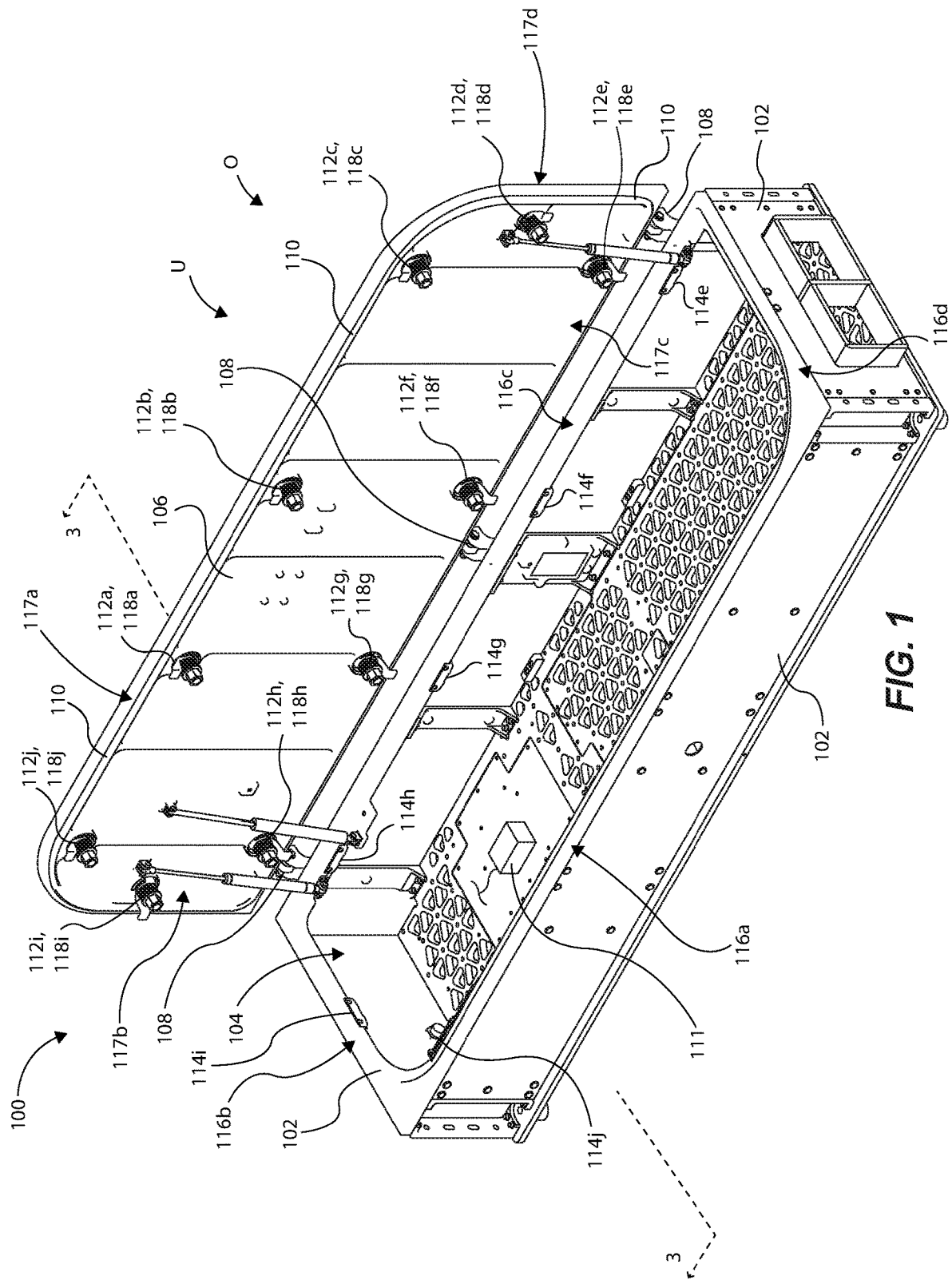
FIG. 1 illustrates a front perspective view of an enclosure locking assembly, and showing a door opened relative to a cabinet, in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth a latch system for locking and sealing of a door to a cabinet, the latch system comprising a latch receiver configured to be secured to a cabinet, the latch receiver comprising a first ramp and a second ramp oriented transverse relative to one another, and a rest surface juxtaposed to the second ramp; a door latch comprising: a handle; a shank coupled to the handle, and comprising a length operable to extend through an aperture of a door coupled to the cabinet to facilitate coupling of the door latch to the door; and a cam latch supported by the shank, and comprising a lock arm operable to slide along the first and second ramps, wherein in response to rotation of the handle in a first direction with the door latch in an unlocked position, the shank and the cam latch rotate to cause the lock arm to slidably interface with the first and second ramps of the latch receiver, and to seat against the rest surface, thus placing the door latch in a locked position, and facilitating locking of the door to the cabinet.

The latch receiver can comprise a plurality of ramps, including the first and second ramps.

The lock arm can comprise a first cam surface operable to slidably interface along the first and second ramps while moving to the locked position.

The lock arm can comprise a second cam surface that extends around an end portion of the lock arm from the first cam surface, wherein the second cam surface is operable to slidably interface along a curved chamfered corner of the latch receiver while moving to the locked position.

The lock arm can comprise a third cam surface, such that the second cam surface extends between the first and third cam surfaces, wherein the first and third cam surfaces are formed on opposing sides of the cam lock, such that either side of lock arm can interface with the latch receiver when moving to the locked position in response to respective first and second directions of rotation of the handle and the cam latch.

The shank can extend through a keyed aperture of the cam latch, such that the cam latch is axially slidably interfaced to the shank, and such that the cam latch is rotationally fixed to the shank.

The door latch can further comprise an elastic element operably coupled between the cam latch and a spring seat component of the door latch, whereby the elastic element operates to apply a biasing force to the cam latch to apply a compression load between the cam latch and the latch receiver when in the locked position.

The door latch can further comprise a load adjustment mechanism operable to adjust the compression load.

The latch receiver can comprise a bi-directional lock profile at least partially defined by the first ramp and a third ramp of the latch receiver that are mirrored relative to each other along a plane that extends through the rest surface, such that the cam latch is operable to be locked to the latch receiver, via respective first or third ramps, from the first direction or a second direction via rotation of the handle.

The present disclosure also sets forth an enclosure locking assembly, comprising an enclosure having an inner area; a door coupled to the enclosure; a seal supported by one of the door or the enclosure; a plurality of latch receivers each secured to different sides of the cabinet, each latch receiver comprising a plurality of ramps and a rest surface; and a plurality of door latches supported about different sides of the door, each door latch comprising a handle, a shank coupled to the handle and extending through an aperture of the door, and a cam latch supported by the shank and comprising a lock arm, the lock arm having first and second cam surfaces opposing each other, wherein, in response to rotation of each of the respective handles of the plurality of door latches in either rotational direction relative to the door, one of the first or second cam surfaces of the lock arms slidably interfaces with the ramp of the latch receivers to seat the lock arms against the rest surfaces of the latch receivers, respectively, thus placing the door latches in a locked position to lock and seal the door to the cabinet.

Figure 2:
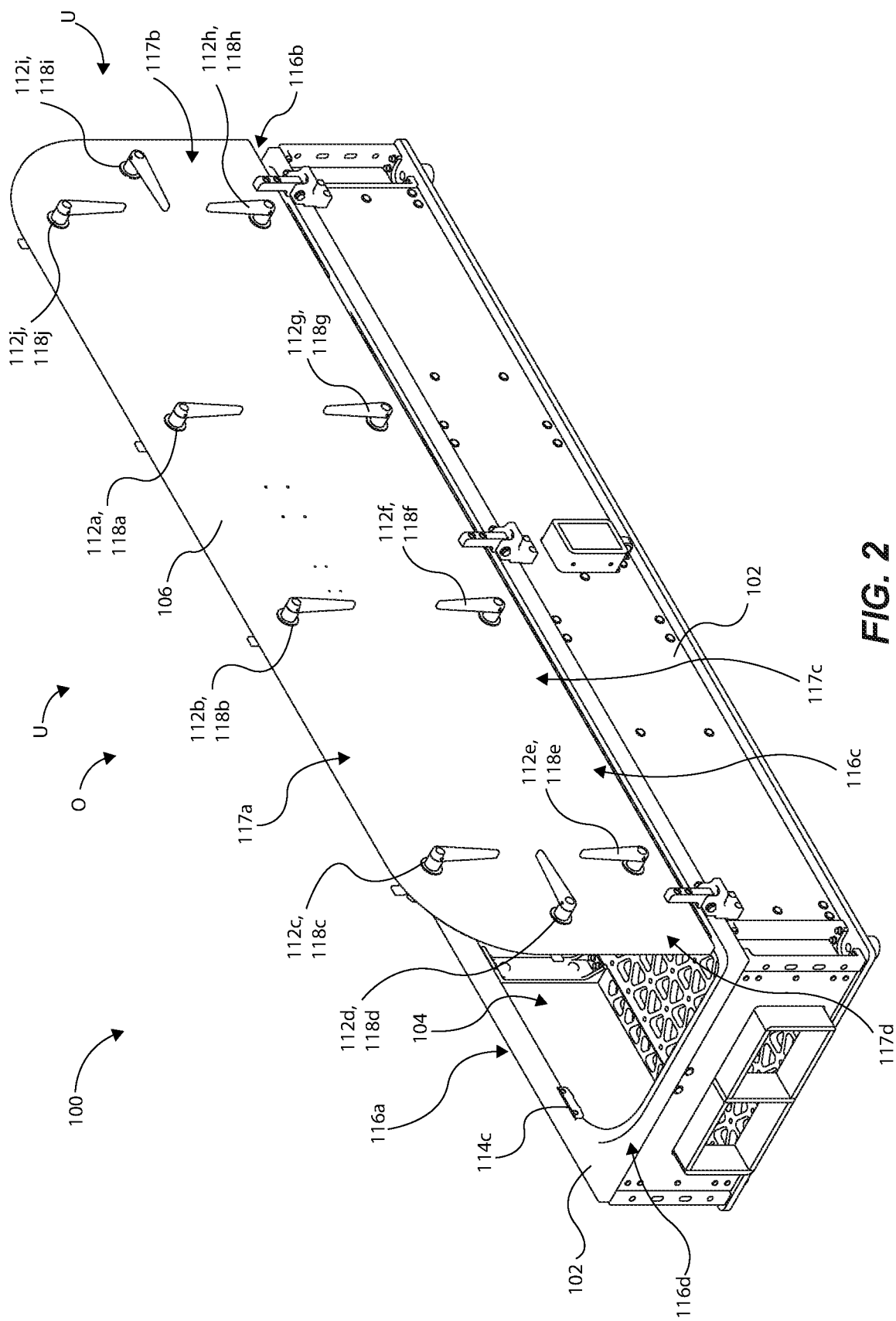
FIG. 2 illustrates a rear perspective view of the enclosure locking assembly of FIG. 1.

To further describe the present technology, examples are now provided with reference to the figures. FIGS. 1 and 2 illustrate an enclosure locking assembly 100 comprising an enclosure or cabinet 102 having an inner area 104, and a cover or door 106 coupled to the cabinet 102 via hinges 108. In one example, a seal 110 can be supported by and attached to the underside of the door 106 (see also FIG. 5), and the seal 110 can continuously extend around an inner perimeter area of the door 106 for sealing the inner area 104 and the door 106 of the cabinet 102 when the door 106 is closed (see e.g., FIGS. 4 and 5). The enclosure locking assembly 100 can further comprise a plurality of individual latch systems 112a-j for facilitating locking and sealing the door 106 to the cabinet 102. The latch systems 112a-j can comprise respective latch receivers 114a-j (only a handful shown/labeled) supported about the opening of the cabinet by respective sides 116a-d of the cabinet 102. As further detailed below, the latch systems 112a-j can further comprise respective door latches 118a-j each operable from an unlocked position U (FIGS. 1-3) to a locked position L (FIGS. 4 and 5), where each door latch 118a-j is locked and secured to the respective latch receivers 114a-j when in the locked position L to lock and seal the door 106 to the cabinet 102, as further detailed in FIG. 5 (showing one door latch 118a locked to latch receiver 114a).

At least some of the door latches 118a-j are supported on different and respective sides 117a-d of the door 106 (at corresponding positions relative to the respective sides 116a-d of the cabinet 102). This helps to ensure more uniform sealing between the door 106 and the cabinet 102, because compression loads on the seal 110 between the door 106 and the cabinet 102 (via the latch systems 112a-i) can be generally evenly or equally or uniformly distributed around the seal 110 to ensure effective, consistent sealing.

Figure 3:
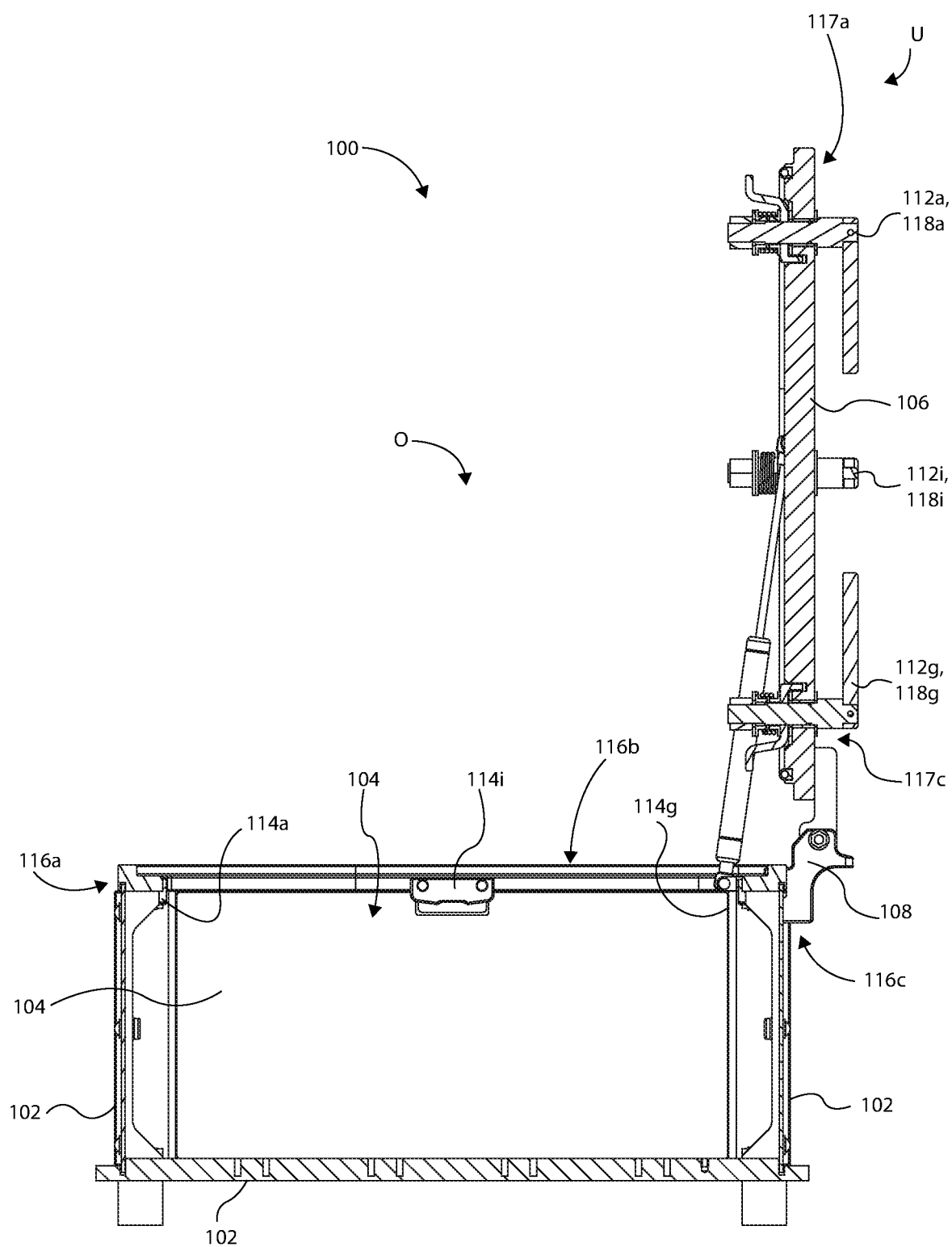
FIG. 3 illustrates a side cross-sectional view of the enclosure locking assembly of FIG. 1, and taken along lines 3-3 in FIG. 1.

Note that FIGS. 1-3 show the door latches 118a-j in closed or locked positions, but in fact they are not "locked" to their respective latch receivers 114a-j. Therefore, prior to the door 106 being closed to the cabinet 102, each door latch 118a-j can be rotated to an open and unlocked position, and then they can each be operated to be locked to their respective latch receivers 114a-j to lock the door 106 to the cabinet 102.

As will be apparent to those skilled in the art, in one example, the number of latch systems employed to seal the door to the cabinet can be less than the number shown. For example, in some cases only two latch systems (e.g., 112a and 112g) may be needed and utilized to lock and seal a door to a cabinet, which may be the case with smaller doors and cabinets, or in circumstances where spring loads are increased per door latch to reduce the number of door latches that may be required for a particular design. Furthermore, as will also be apparent to those skilled in the art, more latch systems than the number shown can be employed. Indeed, any number of latch systems can be utilized, depending upon the size, seal durometer value, and configuration of the cabinet, the intended use, and other factors.

The cabinet 102 and door 106 can be constructed of a rigid material, such as suitable metals, composites, etc. The cabinet 102 can be defined by a plurality of sidewalls that define an opening to the inner area 104. The door 106 can be supported in the open position by one or more pneumatic actuators, as shown, which may be useful in applications where the cabinet 102 is attached upside-down or inverted to a structure, such as a RAM device. The pneumatic actuators can be sized and configured to hold open the door 106 during servicing or maintenance associated with the enclosure locking assembly 100.

Figure 4:
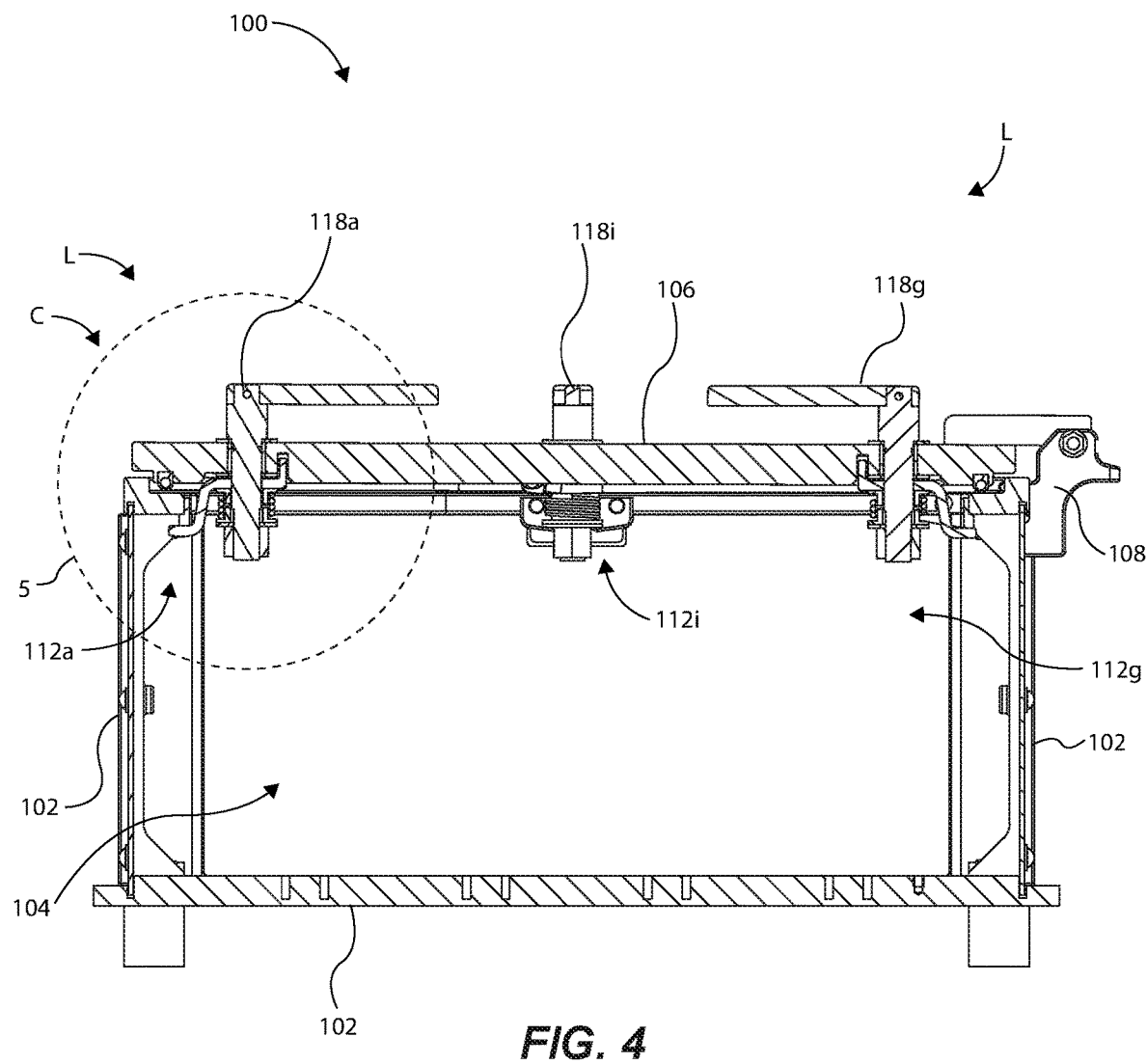
FIG. 4 illustrates the enclosure locking assembly of FIG. 1, showing the door closed to the cabinet, and showing latch systems (i.e., one latch receiver and door latch) in locked positions.
Figure 5:
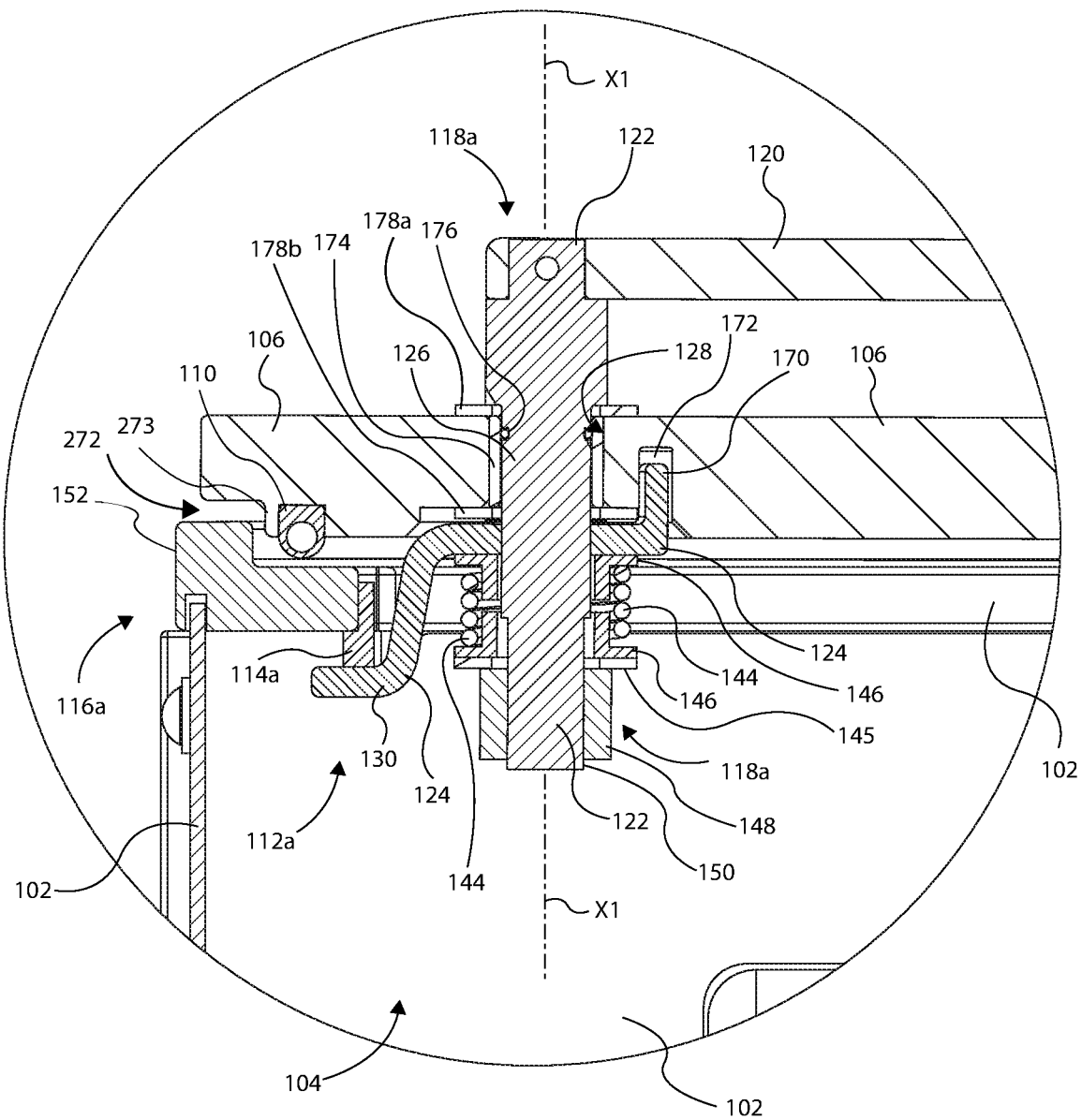
FIG. 5 is a close-up view of a circular section of one of the latch systems of the enclosure locking assembly of FIG. 1, the latch system being shown in the locked position.

FIGS. 4 and 5 illustrate a cross-sectional view of the latch system 112a for (partially) facilitating locking and sealing the door 106 to the cabinet 102, and showing the door latch 118a in the locked position L engaged with the latch receiver 114a attached to the cabinet 102. With particular reference to the close-up view of FIG. 5, the door latch 118a can comprise a handle 120, a shank 122 supported by or coupled to the handle 120, and a cam latch 124 supported by the shank 122. The shank 122 can comprise a section or length 126 that extends through an aperture 128 of the door 106 to facilitate coupling of the door latch 118a to the door 106.

That is, the shank 122 can rotate relative to the door 106 and about the aperture 128. As shown, the handle 120 is situated on an exterior side of the door 106, while the cam latch 124 is situated within an interior side of the door 106 (and within the inner area 104 of the cabinet 102).

Figure 6:
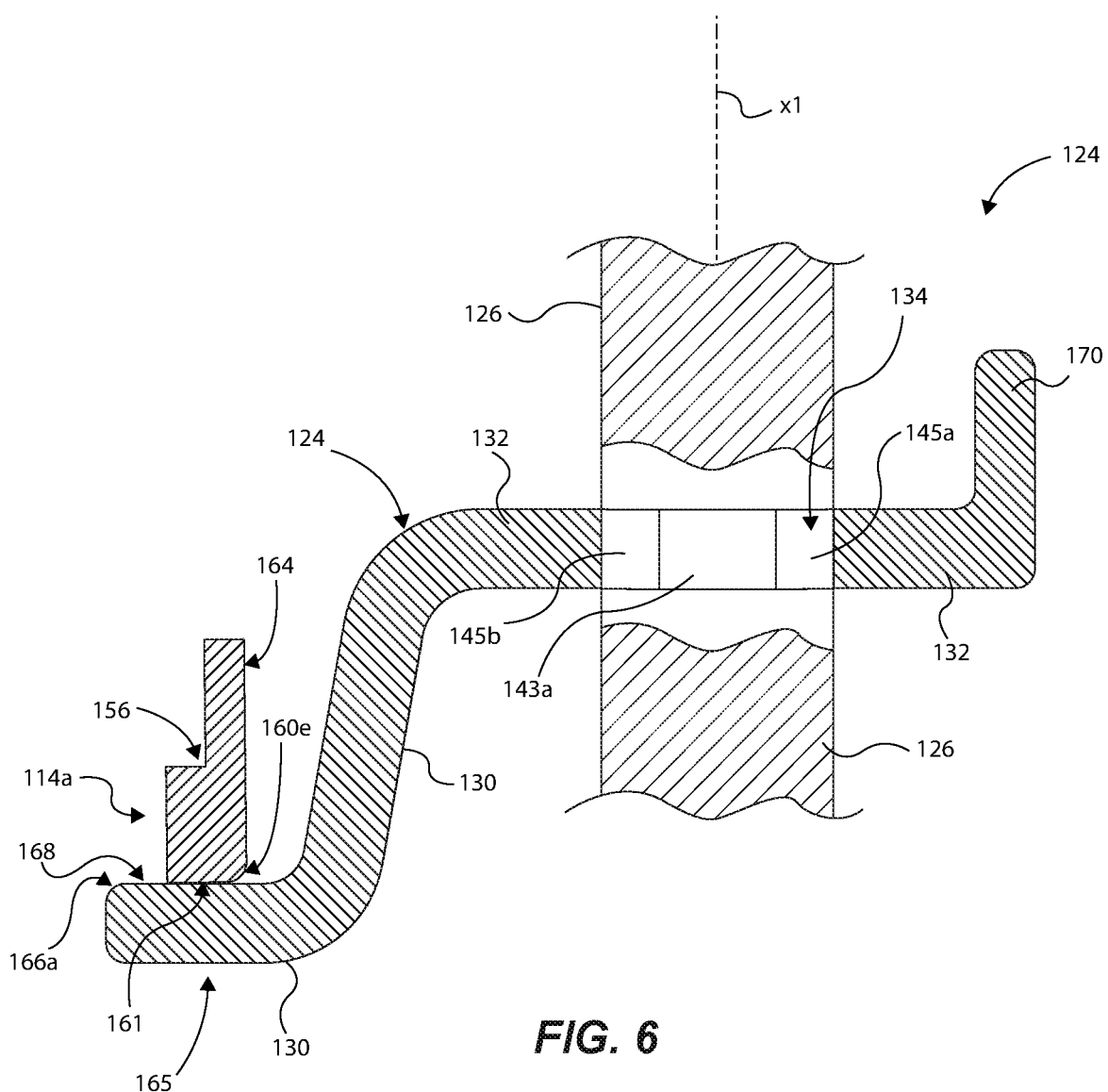
FIG. 6 shows a detailed cross-sectional view of some of the components of the latch system of FIG. 5, these being shown in the locked position.
Figure 7:
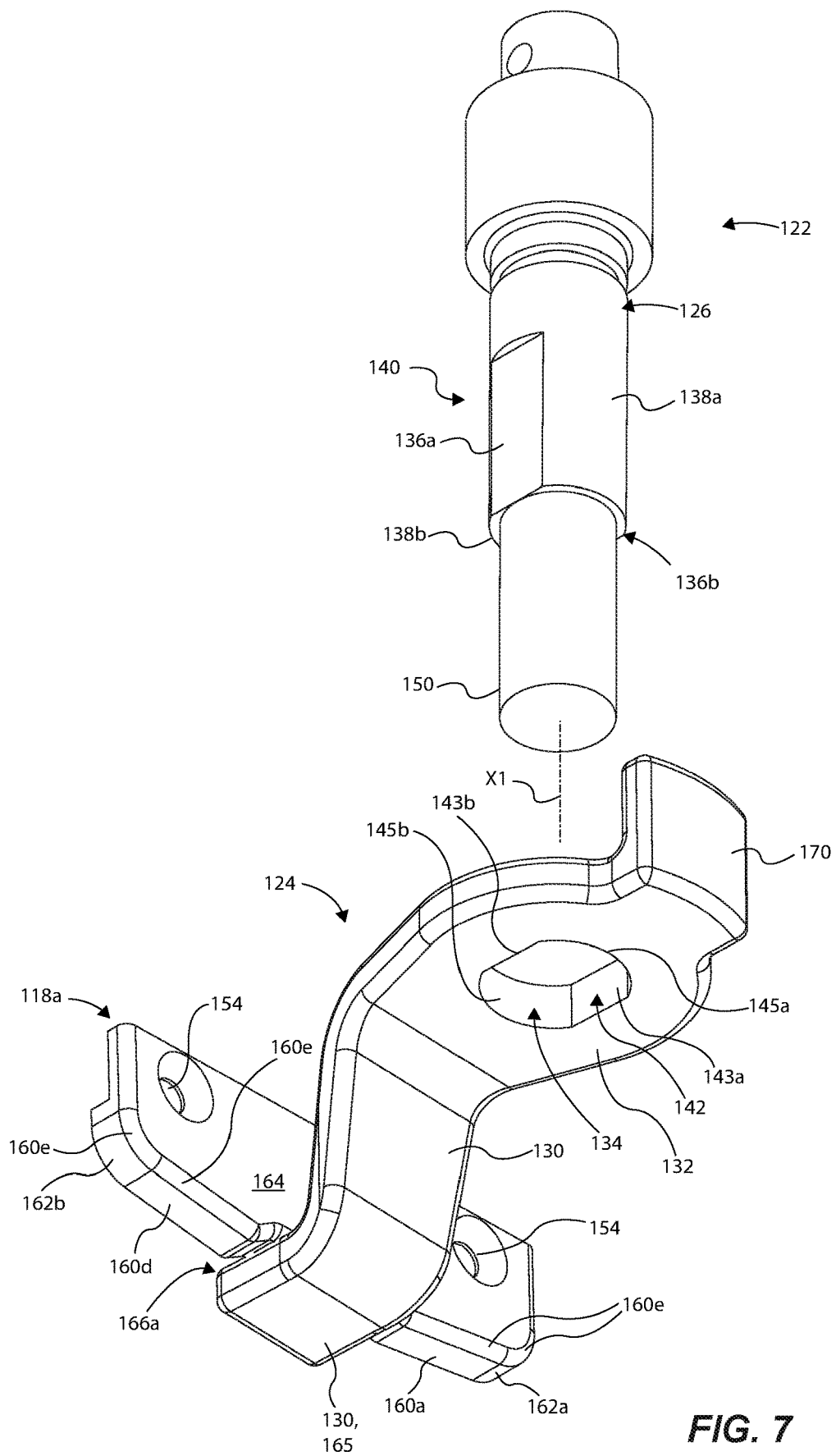
FIG. 7 shows an isometric view of the isolated components of the latch system of FIG. 6, showing a shank exploded from a cam latch.

With particular reference to FIGS. 5-8B showing further details of the latch system 112*a* of FIG. 4, the cam latch 124 of the door latch 118*a* can comprise a lock arm 130 that extends from a shank interface body 132 of the cam latch 124. The cam latch 124 can comprise a keyed aperture 134 formed centrally through the shank interface body 132, configured to receive and interface with the shank 122 (see FIGS. 5-7). The shank 122 can comprise first and second recesses or slots 136*a* and 136*b* (FIG. 7) opposing each other on opposing sides of the shank 122, and first and second curved surfaces 138*a* and 138*b* that extend radially between respective first and second slots 136*a* and 136*b*. The first and second slots 136*a* and 136*b* can each comprise a planar surface, as shown in FIG. 7 (or the slots can take other curved or irregular surface shapes).

The first and second slots 136*a* and 136*b*, and the first and second curved surfaces 138*a* and 138*b*, collectively define a cam interface surface 140 that extends around and along a middle length of the shank 122. As further shown in FIG. 7, the keyed aperture 134 of the cam latch 124 can be defined by a shank interface surface 142, which has a shape and size that corresponds to the shape and size of the cam interface surface 140 of the shank 122 (at the length of the shank 122 that interfaces with the cam latch 124). Thus, the shank interface surface 142 can be defined by first and second planar surfaces 143*a* and 143*b*, and first and second curved surfaces 145*a* and 145*b*, all of which interface to respective slots 136*a* and 136*b* and curved surfaces 138*a* and 138*b* of the shank 122. In this interface arrangement, the cam latch 124 is axially slidable about the shank 122 along the axis of rotation X1, via the axial sliding interfacial movement between the cam interface surface 140 of the shank 122 and the shank interface surface 142 of the cam latch 124. However, the cam latch 124 remains rotational fixed or attached to the shank 122, because the corresponding shapes of the shank interface surface 142 and the cam interface surface 140, which rotationally fixes the cam latch 124 to the shank 122. Therefore, upon rotation of the handle 120 (in either the clockwise or counterclockwise rotation), the shank 122 concurrently rotates, which concurrently rotates the cam latch 124 about the axis of rotation X1 when moving to and from the locked and unlocked positions.

The purpose for axially sliding the cam latch 124 along the shank 122, but rotationally fixing them together in this manner is so that the cam latch 124 can axially slide down when being locked to the latch receiver 114*a*, and can axially slide up when being unlocked from the latch receiver 114*a* (or during weapon firing due to G-loading from the weight of the door 106 transferred to the cam latch 124 into the latch receiver 114*a*, as discussed below). More specifically, and in one example, the door latch 118*a* can comprise an elastic element, such as a spring 144 (FIG. 5) (e.g., a compression coil spring) that is operably coupled between the cam latch 124 and a spring seat component 145 of the door latch 118*a*. Supporting the spring seat component 145 is a nut 148 threadably coupled to a threaded end 150 of the shank 122 (such threadable interface and operation of the nut 148 is further discussed below).

In one example, the spring 144 can surround a portion of the shank 122, and can be seated and compressed between or against a pair of spring locator bushings 146 (upper and lower bushings) that each have an aperture for loosely receiving a section of the shank 122, and for centering the spring 144 about axis of rotation X1. In this way, the pair of spring locator bushings 146 can properly seat the spring 144 in its desired position, so that the bushings 146 are movable toward or away from each other in response to compression or expansion movement of the spring 144 (i.e., during unlocking and locking of the door latch 118*a*). The spring locator bushings 146 can each be L-shaped circular bushings that have a shoulder for supporting respective ends of the spring 144. Note that, in this example, the spring 144 is a coil spring having an inner diameter area for receiving a section of the shank 122. However, a plurality of (smaller) springs (or wave washers) can be seated and arrayed around a perimeter of the shank 122 in a suitable manner.

In the unlocked position U, the spring 144 can apply a normal or nominal biasing force to a lower side of the shank interface body 132 of the cam latch 124. While the door latch 118*a* is moved to the locked position L via rotation of the handle 120 (and the shank 122 and cam latch 124), the lock arm 130 can begin to slidably interface to the latch receiver 114*a*, which automatically causes or applies a downward axial load on the cam latch 124, which causes the spring 144 to further compress from the normal biasing force to allow for downward axial sliding movement of the cam latch 124 along the shank 122. Thus, rotational movement of the shank 122 and the cam latch 124 is converted into axial or translational movement of the cam latch 124 along the shank 122, so that the latch arm 130 can interface with and lock to the latch receiver 114*a* (as further detailed below). Therefore, the spring 144 operates to apply a biasing force to the cam latch 124 to apply a compression load between the cam latch 124 and the latch receiver 114*a* when the door latch 118*a* is in the locked position to secure the door 106 to the cabinet 102. Thus, the spring biasing force applied to the cam latch 124 is transferred as an axial compression load through the lock arm 130 and to the latch receiver 114*a*, so that a resulting compression load is generated between the cam latch 124 and the latch receiver 114*a*. Such compression load is thereby transferred to the seal 110 to slightly compress the seal 110, thereby properly sealing the door 106 to the cabinet 102 to protect the contents therein. In one example, at least one electronics or electrical component 111 can be supported by the cabinet 102 and in the inner area of the cabinet 102, so that the seal 110 operates to protect the electronics component 111 from dust, debris, moisture, etc. (and also from electromagnetic interference (EMI) in cases where the seal 110 comprises an EMI blocking element or material).

Turning to the details of the latch receiver 114*a*, FIG. 5 shows that the latch receiver 114*a* can be supported by or attached to an enclosure frame 152 supported by side walls of the cabinet 102. Note that an upper surface of the enclosure frame 152 can interface with the seal 110 when the door 106 is closed and locked to the cabinet 102. Further note that the seal 110 can be any shapes and sizes that serve as weather, environmental, or EMI seal that is seated (or adhered on) and secured into a recess about an inner side and perimeter of the door 106, so that the seal 110 faces the enclosure frame 152 of the cabinet 102 for sealing thereto. The enclosure frame 152 can be a continuous frame that extends around all four sides of the cabinet 102, and is attached to sidewalls of the cabinet 102 by suitable means, such as via fasteners. The door 106 can have a seal protection flange 273 that supports the seal 110, and that faces toward the exterior of the cabinet 102 through a gap 272 between the door 106 and the enclosure frame 152. The seal protection flange 273 can serve as a water splash guard feature along the perimeter of the sealing interface between the door 106 and the enclosure frame 152, which can help to prevent high velocity water droplets (e.g., from weather events) from bypassing the seal 110 and into the cabinet 102.

The latch receiver 114a can be mounted to the enclosure frame 152 via fasteners (not shown) through apertures 154 (FIG. 7) of the latch receiver 114a. Alternatively, the latch receiver 114a can be welded, adhered, brazed, or otherwise secured to the enclosure frame 152, or the latch receiver 114a can be direction attached to a sidewall of the cabinet 102. The latch receiver 114a can include a shoulder portion 156 (FIG. 6) that interfaces and seats against a corner section 158 of the enclosure frame 152 (FIG. 5) to secure and hold the latch receiver 114a in position, and to resist upward loads acting on the latch receiver 114a from the cam latch 124.

Figure 9:
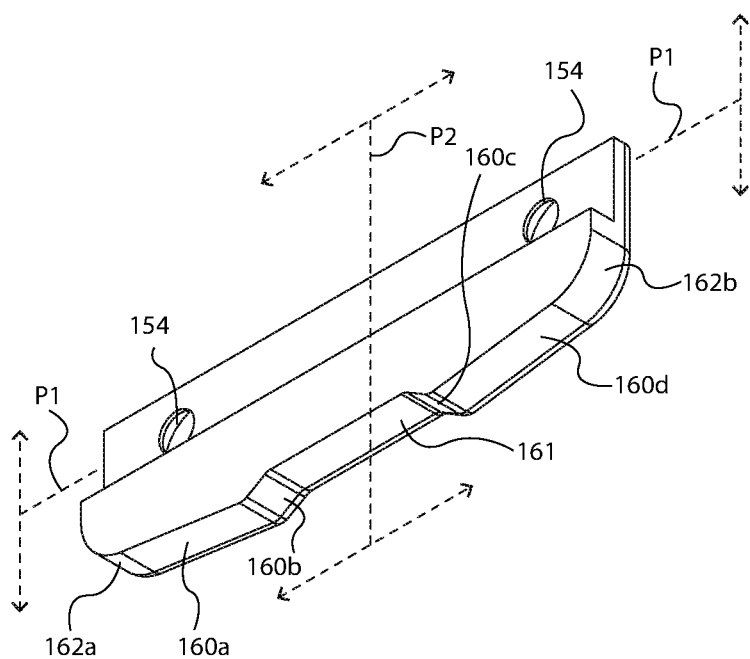
FIG. 9 shows an isometric view of the latch receiver of FIGS. 5-7.
Figure 10:
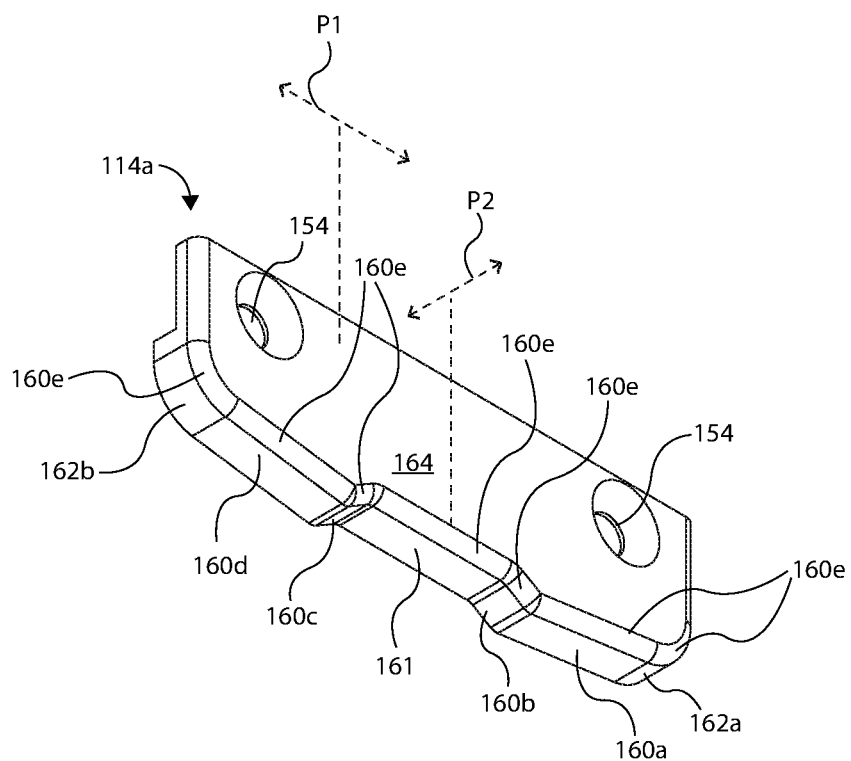
FIG. 10 shows an isometric view of the latch receiver of FIGS. 5-7.
Figure 11:
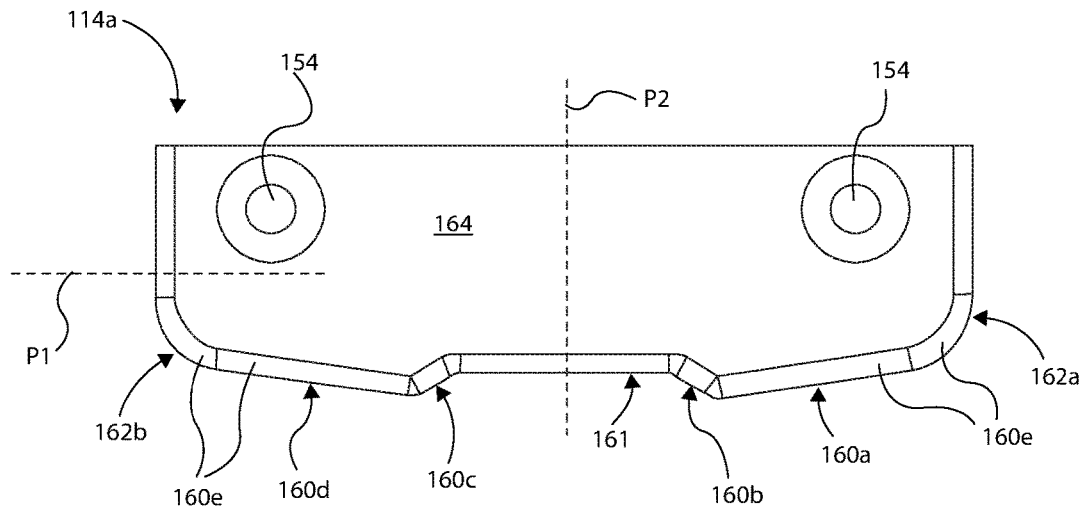
FIG. 11 shows a front view of the latch receiver of FIGS. 5-7.

In one example as illustrated in FIGS. 9-11 (and also in FIGS. 6 and 7), the latch receiver 114a can comprise a wedge shaped profile or configuration defined by a plurality of ramps 160a-d and a rest surface 161. The rest surface 161 can be a flat or planar lock surface that extends between, and is juxtaposed to, ramps 160b and 160c that are on either side of the rest surface 161. The latch receiver 114a can further comprise another ramp 160e in the form of a curved chamfered corner or edge that extends along and is adjacent each of the ramps 160a-d and the rest surface 161. A first curved end 162a can extend from ramp 160a to a first side of the latch receiver 114a, and on the other side of the latch receiver 114a a second curved end 162b can extend from ramp 160d to a second side of the latch receiver 114a. The latch receiver 114a can further comprise a front face 164 that can be a flat or planar surface that transitions to the ramp 160e along the sides and bottom length of the latch receiver 114a. The front face 164 can be considered a normal planar surface that defines a first plane P1 along its planar surface. A second plane P2 can extend orthogonally relative to the first plane P1 through a central portion of the latch receiver 114a. As best illustrated in FIGS. 10 and 11, the latch receiver 114a can be symmetrical about the second plane P2 that extends orthogonally relative to the first plane P1, and therefore plane P2 extends orthogonally or perpendicular to the front face 164. In this manner, as discussed below, either of the left and right sides of the lock arm 130 of the cam latch 124 can be interfaced and locked to the latch receiver 114a when the lock arm 130 is rotated in either the clockwise or counterclockwise directions (i.e., first and second directions) relative to the latch receiver 114a. Said another way, the latch receiver 114a can comprise a bi-directional or multidirectional lock profile (i.e., the cam latch 124 can be locked from either direction) at least partially defined by opposing ramps 160a and 160d that mirror each other about the second plane P2. That is, the bi-directional or multidirectional lock profile of the latch receiver 114a is formed so that the cam latch 124 can slidably interface with either one of the ramps 160a and 160d when moved to the locked position L from either direction of rotation.

Note that ramps 160a and 160d are formed at an angle relative to the rest surface 161, and the ramps 160b and 160c are formed at an angle relative to the rest surface 161 (and at a different angle or slope relative to ramps 160a and 160d). Thus, the combination of the surfaces of the ramps 160a-d and the rest surface 161 are juxtaposed to each other, and are somewhat shaped to define a wedge or W-shape (i.e. one of the ramps 160a, 160b and one of the ramps 160c, 160d has one of a positive or negative slope relative to the rest surface 161, and the other one of the ramps 160a, 160b, and the other one of the ramps 160c, 160d has the other of a positive or negative slope relative to the rest surface 161), and to assist guiding the lock arm 130 of the cam latch 124 can seat against the rest surface 161 of the latch receiver 114a. Therefore, the lock arm 130 can be "locked" or secured between ramps 160b and 160c, and seated against the rest surface 161, until such time that the door latch 118a is manually moved to the unlocked position. That is, the cam latch 124 will be locked in place to the latch receiver 114a until a sufficient torque is applied to the handle by a user to unlock the door latch to overcome the spring biasing force of the spring to unlock the door latch, as further exemplified below. The wedge or W-shaped profile of the latch receiver 114a is beneficial to maintain the locked position of the lock arm 130 during high-load or shock events experienced by the enclosure locking assembly 100, such as in an example where the enclosure locking assembly 100 is attached upside down to a RAM operable to fire missiles. That is, upon firing a missile, the enclosure locking assembly 100 may experience a substantial G-force (e.g., 5 Gs or more), which may result in large forces being exerted on the door 106 due to its weight and position relative to the trajectory of the fired missile. As a result of such forces on the door 106, the spring 144 may "bottom out" because of the load placed onto the cam latch 124, which will also cause the seal 110 to further compress. However, as the spring 144 bottoms out, the lock arm 130 will remain seated against the rest surface 161 because of the aforementioned wedge shaped profile of the latch receiver 114a. In this manner, the various door latches do not inadvertently wiggle open or otherwise move to the unlocked position during firing of the missile, for instance. After such high G-forces, the spring 144 will automatically expand to a normal or nominal state in the locked position. This helps to maintain the integrity of the seal 110 during and between firing of missiles, because sealing engagement between the seal 110 and the enclosure frame 152 remains continuous despite the compression of the spring 144 during firings and the subsequent expansion of the spring 144 after firings.

Figure 8A:
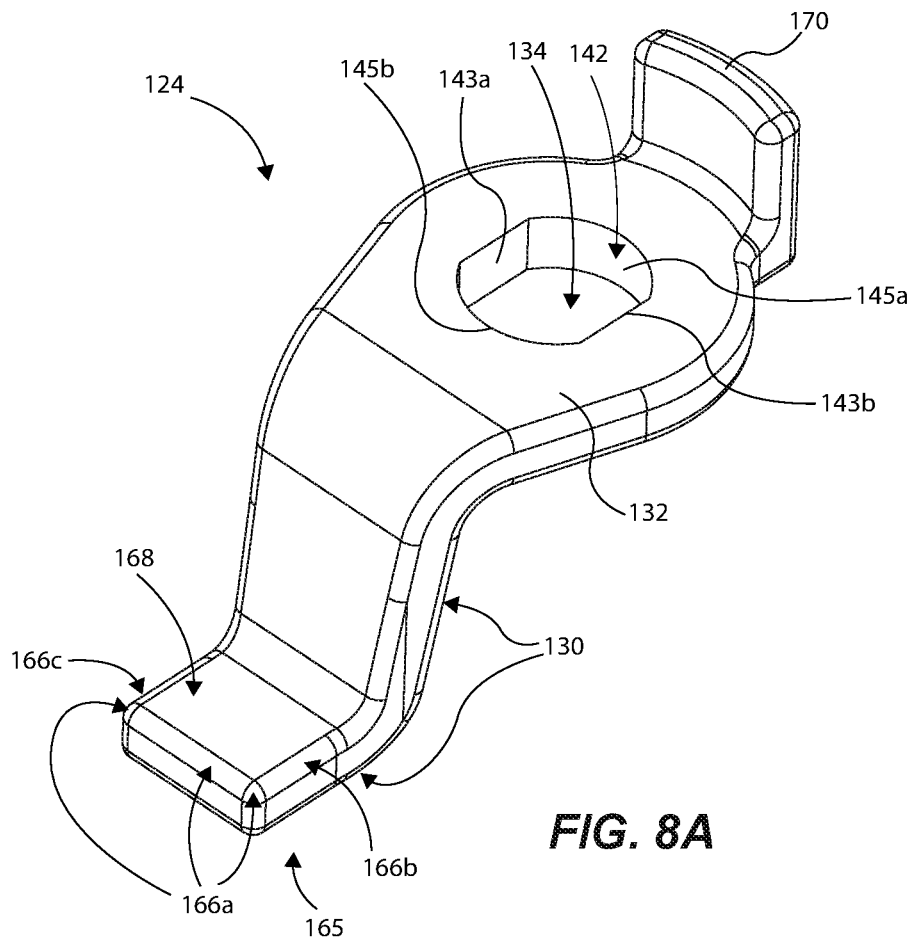
FIG. 8A shows an isometric view of the cam latch of FIGS. 5-7.
Figure 8B:
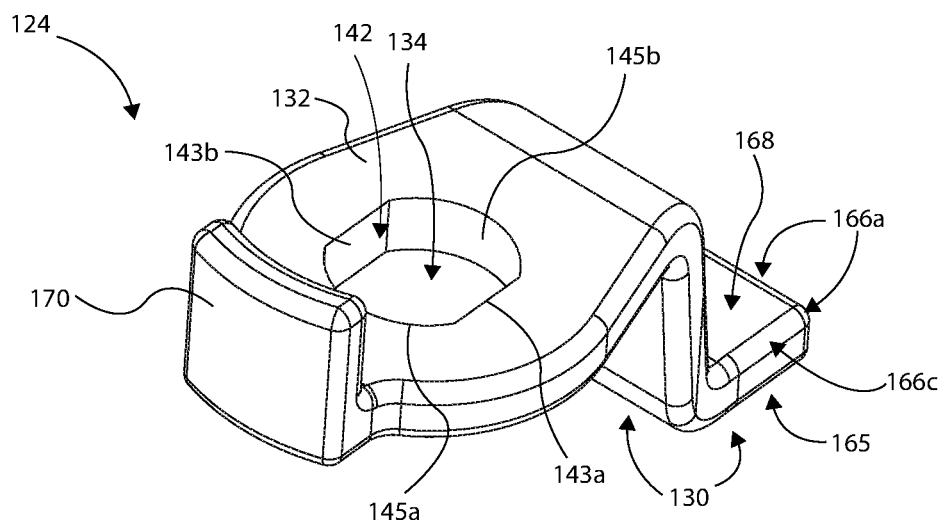
FIG. 8B shows an isometric view of the cam latch of FIGS. 5-7.

With further specificity regarding locking the cam latch 124 to the latch receiver 114a, when moving from the unlocked position via rotation of the handle 120 and the shank 122 (assume the counterclockwise direction from a top down perspective of FIG. 5) about the axis of rotation X1, a left side or point of the lock arm 130 can interface with and slide along a portion of the ramp 160e adjacent the first curved end 162a. More particularly, as shown in FIGS. 8A and 8B, the lock arm 130 can comprise a cam lock end 165 that extends laterally and generally parallel to the shank interface body 132, so that cam lock end 165 is vertically offset from the shank interface body 132 axially along the axis of rotation X1. The cam lock end 165 can be at least partially defined by an end or front cam surface 166a, a left cam surface 166b, a right cam surface 166c, and a planar lock surface 168. The front cam surface 166a can include left and right corner areas and a front corner area of the cam lock end 165, as indicated by the arrows in FIG. 8A.

The cam surfaces 166a-c can be curved chamfered corners that extend around three sides (left, right, front) of the cam lock end 165, and are shaped in this manner to minimize or reduce friction between the cam lock end 165 and the latch receiver 114a when being moved to and from the locked position L, as further explained below. Reducing friction in this manner is beneficial because less torque may be required to lock/unlock the door latch 118a to overcome the spring force of the spring 144, which allows for a stiffer spring to generate a greater compression load between the cam latch 124 and the latch receiver 114*a* (as compared to a similar door latch that does not have curved chamfered corners).

The planar lock surface 168 of the cam latch 124 (FIGS. 6 and 8A) can be a planar or flat surface that is generally parallel to the rest surface 161 of the latch receiver 114*a*, and therefore the planar lock surface 168 can be biased or interfaced to the rest surface 161 when in the locked position.

Turning to the sequence of "surface sliding movement" between the cam latch 124 and the latch receiver 114*a*, when moved to the locked position L, a point of the front cam surface 166*a* of the cam latch 124 can initially interface/engage with ramp 160*e* of the latch receiver 114*a* (i.e., the corner of ramp 160*e* near the first curved end 162*a* on the right side of the latch receiver 114*a*). Such sliding interface between the front cam surface 166*a* and the ramp 160*e* provides "line contact" or "line interface sliding contact" because the front cam surface 166*a* is curved, so that contact during sliding occurs along a "line" between the curved front cam surface 166*a* and the ramp 160*e* (as opposed to a surface-to-surface contact where both surfaces are flat). This "line contact" between the front cam surface 166*a* and the ramp 160*a* helps to reduce friction between the cam lock end 165 and the latch receiver 114*a*, which is beneficial to overcome the initial compression load or biasing force of the spring 144 (which may be relatively high, in some examples).

As rotation of the cam latch 124 continues in this counterclockwise direction, the planar lock surface 168 can slidably interface or engage with ramp 160*a* as "surface contact", meaning that the planar lock surface 168 is in flat surface-to-surface contact with the flat surface of ramp 160*a*. Then, the left cam surface 166*b* can interface or engage with ramp 160*b* in as "line contact" to minimize friction and further overcome the biasing force of the spring 144. During the period that the cam latch 124 transitions along ramp 160*a* to ramp 160*b*, the cam latch 124 is being rotated about axis of rotation X1, but is also axially sliding along the shank 122 along the axis of rotation X1, as discussed above. Meanwhile, the spring 144 is being further compressed.

In a final sliding motion, the right cam surface 166*c* of the cam latch 124 can slide along the ramp 160*b* until such time that the cam latch 124 "pops" or locks into place against the latch receiver 114*a*, such that the planar lock surface 168 is interfaced with the rest surface 161 of the latch receiver 114*a*, thereby completing the operation of moving the door latch 118*a* from the unlocked position U to the locked position L (FIGS. 6 and 7). In this manner, because of the aforementioned upward directions of the ramps 160*b* and 160*c* disposed on either left or right side of the cam lock end 165 of the cam latch 124, the cam latch 124 is thereby restricted or prevented from moving either clockwise or counterclockwise to the unlocked position U without a sufficient torque applied to the handle 120 via a user (to overcome the compression load or biasing force applied by the spring 144 to the cam latch 124). For instance, the spring 144 (and the latch system 112*a*) can be designed or tuned such that at least 10 ft lbs of torque must be applied to the handle 120 before the cam latch 124 can be unlocked from the latch receiver 114*a*. Said another way, the ramps 160*b* and 160*c* can be considered as "stop ramps" that each act as a "stop" to trap or retain the cam lock end 165 between the ramps 160*b* and 160*c*, which can prevent the cam latch 124 from wiggling or shaking to an unlocked position (such as from induced vibration experienced by the cabinet, the door, and the door latches).

In one example, the cam latch 124 can comprise an orientation control flange 170 opposite or on the other side from the cam lock end 130, and that extends upwardly away from the keyed aperture 134 (and generally orthogonal from the shank interface body 132). Operable with the orientation control flange 170, the door 106 can comprise a radial slot 172 (FIG. 5) formed radially or circularly in at least 180 degrees through an inner side of the door 106. When the door 106 is open and the cam latch 124 is moved to the locked position L (FIGS. 1-3), the orientation control flange 170 is situated into the radial slot 172 to control the orientation of the cam latch 124 relative to the door 106. The radial slot 172 can be sized slightly larger than the size of the orientation control flange 170, so that some amount of friction exists between the radial slot 172 and the orientation control flange 170. This "friction fit" can hold the position of the cam latch 124 when the door 106 is open to eliminate or reduce rattling in high vibration environment. This also helps to reduce or eliminate the need to check and reposition the cam latch 124 while closing the door 106, and further prevents the handle 120 from undesirable rotation outside of the perimeter envelope of the door 106 when opened, which can otherwise be a safety risk if the handle 120 is sticking outside of the envelope of the door 106 when opened.

In one example, the door latch 118*a* can accommodate different thicknesses of doors by designing the shank 122 to be longer or shorter. In some examples, the shank 122 may be directly interfaced to the door 106 through the aperture 128, or, as illustrated in FIG. 5 a cylindrical bushing 174 can surround the shank 122 for acting as a bushing or bearing component between the door 106 and the shank 122. An O-ring seal 176 can be provided between the shank 122 and the bushing 174 for sealing the door latch 118*a* to the door 106. Upper and lower washers 178*a* and 178*b* can be supported on respective exterior and interior sides of the door 106, so that the lower washer 178*b* can act as a bearing surface for the cam latch 124 when being rotated.

With further reference to FIG. 5, in one example the door latch 118*a* can comprise a load adjustment mechanism operable to adjust the compression load between the cam latch 124 and the latch receiver 114*a* (and consequently the compression load applied to the seal 110). More specifically, in one example, the load adjustment mechanism can comprise a fastener component, such as the nut 148, threadably coupled to the threaded end 150 of the shank 122 opposite the handle 120. When the door 106 is opened, an individual can engage the nut 148 with a wrench, and then tighten or loosen the nut 148 via rotation in a respective direction. Tightening the nut 148 will threadably advance the nut 148 along the shank 122 toward the handle 120, which further compresses the spring 144, therefore modifying by increasing the biasing force applied by the spring 144 to the cam latch 124 when unlocked, Conversely, opposite rotation or loosening the nut 148 relieves or expands the spring 144, therefore modifying by decreasing the biasing force of the spring 144. Thus, a higher spring biasing force will result in a higher compression load to the seal 110 when the door latch 118*a* is locked, and a lower spring biasing force will result in a lower compression load to the seal 110. Accordingly, depending on a desired or required compression load applied to the seal 110, the load applied by the door latch 118*a* (and the other door latches of FIG. 1) can be modified by adjusting the position of the nut 148 along the shank 122 to a desired normal or starting spring biasing force. Note that such biasing force of the spring 144 (and other springs on other door latches) can be modified while the door 106 is shut and locked via door latches 118, if the user can gain access to the inner area of the cabinet 102 while the door 106 is locked, such as by reaching into an access opening.

Modifying the biasing force of the spring 144, and therefore modifying the compression load to the seal 110 between the cam latch 124 and the latch receiver 114a, can be beneficial in cases where insufficient compression loads exist along various portions or sections of the seal 110, such that the seal 110 may be ineffective at one or more locations along its length. Accordingly, when the door 106 is closed and locked to the cabinet 102 via the door latches 118a-j, an individual can visually inspect the perimeter of the seal 110 to ensure uniform and proper sealing by visual inspection or measurement of the gap 272 (before and after locking). If the individual notices a non-uniform gap or poor sealing area about the seal 110, the individual can modify the biasing force of one or more springs of one or more door latches, as detailed above (and also below regarding an alternative of FIG. 12) to increase the compression load to the seal 110 at that particular problematic sealing location. This may be particularly useful at the door latch(es) near the corners of the seal 110 (e.g., see FIG. 1, door latches 118c, 118d, and 118e near two corners of the seal 110) where greater or increased compression loads may be required, as compared to compression loads required along linear sections of the seal 110, because of the directional transition of the seal 110 turning a corner, and possible warpage of the door 106 across its perimeter or length. Based on this, the seal 110 (and the door 106 relative to the cabinet 102) can comprise different sealing forces at different sections or locations along its length, depending upon the different biasing forces of the different door latches, in order to initially achieve a good seal and also to maintain the integrity of the seal.

Figure 12:
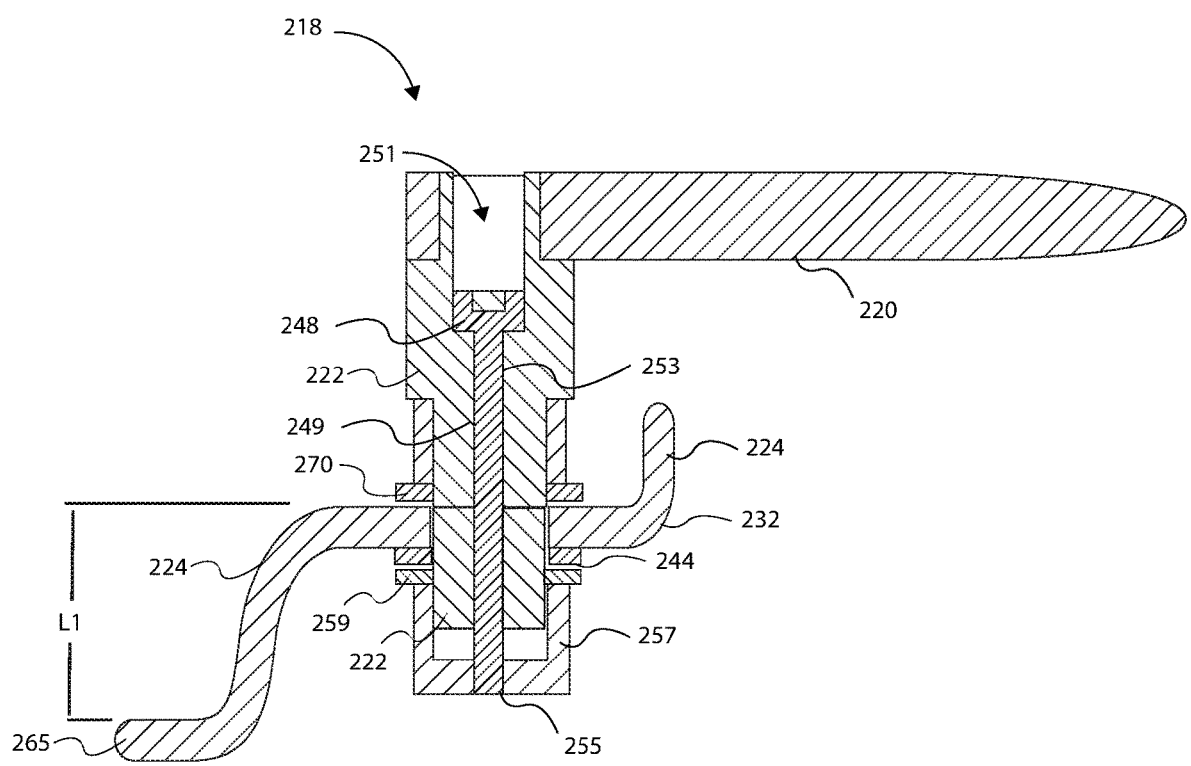
FIG. 12 is a cross-sectional view of a latch system of an enclosure locking assembly, in accordance with an example of the present disclosure.

FIG. 12 shows an alternative example of a door latch 218 having a load adjustment mechanism (i.e., external load adjustment) operable to adjust the compression load between a cam latch 224 and a latch receiver (e.g., 114a). More specifically, the load adjustment mechanism can comprise a fastener component, such as a bolt 248 (e.g., tensioner bolt) that extends through a bore 249 of a shank 222 of the door latch 218. A tool end 251 of the bolt 248 can be seated in a counterbore portion of the shank 222, while a shaft 253 of the bolt 248 extends through the bore 249 of the shank 222. A threaded end 255 of the bolt 248 can be threadably coupled to a tensioner component 257. The tensioner component 257 can be a cap or cup shaped component that receives an end of the shank 222, and that is rotatably fixed to the shank 222 but operable to axially slide relative to the shank 222 (like a keyed configuration). A spring 244, such as a wave washer spring, can surround the shank 222 and can be biased to a lower side of the cam latch 224 to apply a biasing spring force to the cam latch 224. A washer 259 can be situated between a lower side of the spring 244 and an upper side of the tensioner component 257. Thus, when the door (e.g., 106) is closed, an individual can engage the tool end 251 of the bolt 248 with a tool (e.g., hex key wrench), and tighten or loosen the bolt 248 to vary or modify the compression load between the cam latch 224 and the latch receiver (e.g., 114a) from an external area of the cabinet and the door, while the door is locked. Tightening the bolt 248 will threadably advance the tensioner component 257 along the shank 222 and toward the handle 220, which further compresses the spring 244, therefore modifying the biasing force applied by the spring 244 to the cam latch 224 (which therefore modifies the compression force). Expectedly, opposite rotation or loosening the bolt 248 axially moves and advances the tensioner component 257 away from the cam latch 224 and the handle 220, which relieves or expands the spring 244, therefore modifying the biasing force of the spring 244. Accordingly, depending on a desired or required compression load between the door latch 218 and the cabinet (and consequently a compression load on a seal like 110), a user can rotate the bolt 248 relative to the shank 222.

Note that such biasing force of the spring 244 (and other springs on other door latches) can be modified while the door is shut and locked via the door latches, so that the user can visually inspect any improper sealing locations (e.g., variations in the gap 272; see FIG. 5) around the door, and then operate the bolt 248 (and other bolts of other latches) from an external or exterior side of the door when the door is closed and locked via the door latches to apply more or less compression loads to the seal at problematic locations of the seal.

In one example, the door latch 218 can include at least one shim 270, which can be a washer or other component that surrounds the shank 222 to adjust the position of the cam latch 224 by applying a greater or lesser force to the spring 244 (due to the number and/or thicknesses of the shim(s)). The shim 270 can be used to accommodate various thicknesses of differing enclosure frames (e.g., 152 of FIG. 5). For instance, two or more shims can be added to a particular door latch to vary the position of the cam latch 224 (or 124) relative to a latch receiver attached to a cabinet. In this manner, the shim 270 (or multiple shims stacked on each other) can eliminate the need for customization of formation of the cam latch 224 (or 124) for a particular enclosure system (due to assembly tolerance variations, door thickness, etc). This can also help to accommodate manufacturing variations of particular cam latches (i.e., 224), such as a length L1 between a top surface of a cam latch body 232 and a top surface of a cam lock end 265 of the cam latch 224, for instance. Thus, a user can include or select any number and thicknesses/heights of one or more shims to accommodate for variations that would otherwise make difficult or impossible locking of a particular cam latch to a particular latch receiver. Note that the door latches 118a-j of FIG. 1-5 can also each include one or more shims to vary the position of the cam latch.

An O-ring seal can be coupled around the shank 222 and above the cam latch 224, similarly configured as seal 176 of FIG. 5, to prevent water or debris from passing through the door latch 218 into the enclosure.

In some examples, more than one spring (e.g., like 144 or 244) can be utilized to vary or tune a desired biasing force against a particular cam latch. For instance, two or more wave spring washers can be stacked on top of each other and surrounding the shank to provide a desired spring force against the cam latch, and they can be varied in size and spring constants per design parameters.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A latch system for locking and sealing of a door to a cabinet, the latch system comprising:
   a latch receiver configured to be secured to a cabinet, the latch receiver comprising a first ramp, a second ramp, and a planar rest surface juxtaposed to the second ramp, the first ramp having one of a positive or a negative slope relative to the rest surface, and the second ramp having the other of the positive or the negative slope relative to the rest surface;
   a door latch comprising:
      a handle;
      a shank coupled to the handle, and comprising a length operable to extend through an aperture of a door coupled to the cabinet to facilitate coupling of the door latch to the door; and
      a cam latch supported by the shank, and comprising a lock arm operable to slide along the first and second ramps,
   wherein in response to rotation of the handle in a first direction with the door latch in an unlocked position, the shank and the cam latch rotate to cause the lock arm to slidably interface with the first and second ramps of the latch receiver, and to seat against the rest surface, thus placing the door latch in a locked position, and facilitating locking of the door to the cabinet.

2. The latch system of claim 1, wherein the latch receiver comprises a plurality of ramps, including the first and second ramps.

3. The latch system of claim 2, wherein a third ramp of the plurality of ramps comprises a curved chamfered corner that extends along the first and second ramps.

4. The latch system of claim 2, wherein the latch receiver is symmetrical about a plane that extends orthogonally relative to a normal planar surface of the latch receiver, whereby the latch receiver comprises a wedge shaped profile, such that the cam latch is operable to be rotated in either rotational direction so that either side of the lock arm is operable to interface with the latch receiver when moved the locked position.

5. The latch system of claim 1, wherein the lock arm comprises a first cam surface operable to slidably interface along the first and second ramps while moving to the locked position.

6. The latch system of claim 5, wherein the lock arm comprises a second cam surface that extends around an end portion of the lock arm from the first cam surface, wherein the second cam surface is operable to slidably interface along a curved chamfered corner of the latch receiver while moving to the locked position.

7. The latch system of claim 6, wherein the lock arm comprises a third cam surface, such that the second cam surface extends between the first and third cam surfaces, wherein the first and third cam surfaces are formed on opposing sides of the cam lock, such that either side of lock arm can interface with the latch receiver when moving to the locked position in response to respective first and second directions of rotation of the handle and the cam latch.

8. The latch system of claim 1, wherein the rest surface comprises a planar surface that interfaces with a planar lock surface of the lock arm when in the locked position.

9. The latch system of claim 8, wherein the second ramp of the latch receiver defines a first stop ramp formed at an angle relative to the rest surface to restrict the lock arm from moving to the unlocked position.

10. The latch system of claim 9, wherein the latch receiver comprises a third ramp juxtaposed to the rest surface and that defines a second stop ramp formed at an angle relative to the rest surface, such that the second and third ramps and the rest surface define a wedge shaped profile to restrict the lock arm from moving in either rotational directions to the unlocked position.

11. The latch system of claim 1, wherein the rest surface of the latch receiver comprises a planar surface that extends orthogonal relative to an axis of rotation of the shank and the cam latch.

12. The latch system of claim 1, wherein the shank extends through a keyed aperture of the cam latch, such that the cam latch is axially slidably interfaced to the shank, and such that the cam latch is rotationally fixed to the shank.

13. The latch system of claim 12, wherein the door latch further comprises an elastic element operably coupled between the cam latch and a spring seat component of the door latch, whereby the elastic element operates to apply a biasing force to the cam latch to apply a compression load between the cam latch and the latch receiver when in the locked position.

14. The latch system of claim 13, wherein the elastic element comprises a coil spring supported about and surrounding the shank, and wherein the coil spring is configured to apply a normal biasing force to the cam latch when in the unlocked position.

15. The latch system of claim 13, wherein the door latch further comprises a load adjustment mechanism operable to adjust the compression load.

16. The latch system of claim 15, wherein the load adjustment mechanism comprises a fastener component operable to be rotated relative to the shank to modify the biasing force of the elastic element to adjust the compression load.

17. The latch system of claim 16, wherein the fastener component comprises a nut threadably coupled to a distal end of the shank opposite the handle, such that rotation of the nut modifies the biasing force of the elastic element when the door is open.

18. The latch system of claim 16, wherein the fastener component comprises a tensioner bolt that extends through a bore of the shank proximate the handle, the tensioner bolt threadably coupled to a tensioner component supported at distal end of the shank opposite the handle, and wherein the elastic element is situated between the tensioner component and the cam latch, such that rotation of the bolt relative to the shank causes axial movement of the tensioner component to modify the biasing force of the elastic element.

19. The latch system of claim 1, wherein the shank comprises a first slot and a second slot opposing each other on opposing sides of the shank, and wherein the cam latch comprises a keyed aperture that receives the shank, the keyed aperture at least partially defined by a first slot interface surface and a second slot interface surface that interface with the first and second slots of the shank, respectively, such that the cam latch is axially slidable along the shank but rotatably fixed to the shank.

20. The latch system of claim 1, wherein the latch receiver comprises a bi-directional lock profile at least partially defined by the first ramp and a third ramp of the latch receiver that are mirrored relative to each other along a plane that extends through the rest surface, such that the cam latch is operable to be locked to the latch receiver, via respective first or third ramps, from the first direction or a second direction via rotation of the handle.

21. The latch system of claim 1, further comprising at least one shim surrounding the shank to accommodate for a thickness of the door.

22. An enclosure locking assembly, comprising:
an enclosure having an inner area;
a door coupled to the enclosure;
a seal supported by one of the door or the enclosure;
a plurality of latch receivers each secured to different sides of the cabinet, each latch receiver comprising a plurality of ramps and a planar rest surface; and
a plurality of door latches supported about different sides of the door, each door latch comprising a handle, a shank coupled to the handle and extending through an aperture of the door, and a cam latch supported by the shank and comprising a lock arm, the lock arm having a first cam surface and a second cam surface opposing each other;
wherein, in response to rotation of each of the respective handles of the plurality of door latches in either rotational direction relative to the door, one of the first or second cam surfaces of the lock arms slidably interfaces with at least one ramp of the plurality of ramps of the latch receivers to seat the lock arms against the planar rest surfaces of the latch receivers, respectively, thus placing the door latches in a locked position to lock and seal the door to the cabinet.

23. The enclosure locking assembly of claim 22, wherein the first and second cam surfaces each comprise a curved chamfered corner, and wherein one of the plurality of ramps of the latch receiver comprises a curved chamfered corner.

24. The enclosure locking assembly of claim 22, wherein the plurality of ramps each extend in different directions relative to each other.

25. The enclosure locking assembly of claim 22, wherein each door latch comprises a load adjustment mechanism comprising a fastener component and an elastic element each coupled to the shank, the fastener component and the elastic element cooperatively operable to modify a compression load applied to the seal via rotation of the fastener component relative to the shank, which modifies a biasing force of the elastic element against the cam latch.

26. The enclosure locking assembly of claim 25, wherein the fastener component comprises a tensioner bolt that extends through a bore of the shank, such that the tensioner bolt is operable from the exterior side of the door when the door latch is in the locked position to modify the compression load when the door is closed and locked.

27. The enclosure locking assembly of claim 22, wherein the seal is supported about an inner perimeter section of the door, such that the seal is compressed between the door and the cabinet when the door latches are in the locked positions.

28. The enclosure locking assembly of claim 22, wherein the door comprises a plurality of radial slots each formed proximate respective door latches, and wherein each cam latch comprises an orientation control flange configured to slide into a respective radial slot of the door when the door latches are moved to the locked position.

29. The enclosure locking assembly of claim 22, wherein the seal comprises electromagnetic interference sealing elements.

30. The enclosure locking assembly of claim 22, further comprising at least one shim surrounding the shank, the at least one shim having a selected thickness to adjust a position of the cam latch.

* * * * *